Nov. 14, 1944.  K. B. KILBORN  2,362,638
REMOVABLE TREAD BLOCK
Filed Oct. 4, 1941
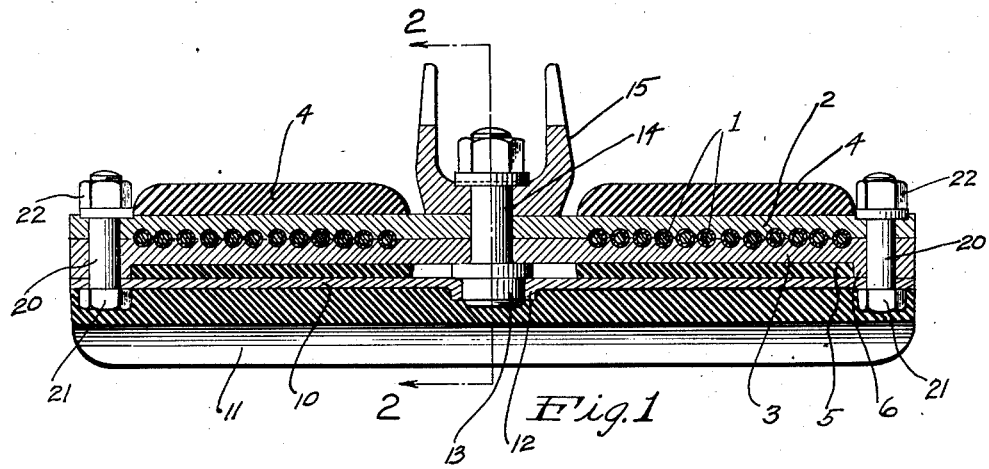
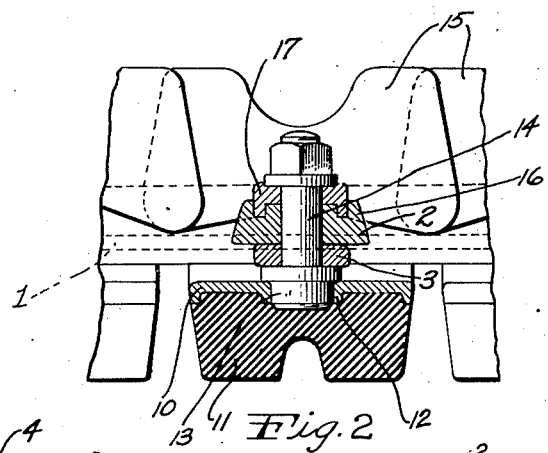
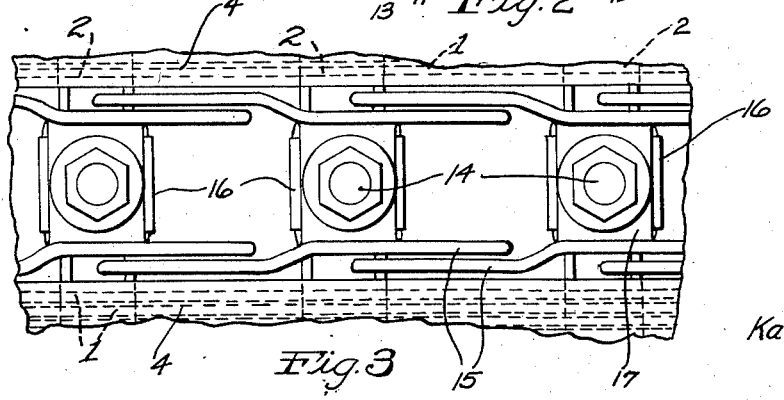
Inventor
Karl B. Kilborn
Attorney Patented Nov. 14, 1944

2,362,638

UNITED STATES PATENT OFFICE 2,362,638

REMOVABLE TREAD BLOCK

Karl B. Kilborn, Akron, Ohio, assignor to Wingfoot Corporation, Akron, Ohio, a corporation of Delaware Application October 4, 1941, Serial No. 413,629

5 Claims. (Cl. 305—10)

This invention relates to a continuous track for a track laying vehicle. More particularly it relates to a removable tread block for such a track and the means for assembling the tread block onto the track.

The usual type of continuous track for a military vehicle or farm tractor or other farm vehicle or steam shovel or the like, in which the track is self-laid, is made up of a cable wound in helical form parallel to the length of the track and the cable is held between clamping plates which are coated on the top and bottom with rubber. The clamping plates are evenly spaced, and it is customary to fasten a removable tread block to each pair of clamping plates. The tread blocks are bolted to the clamping plates at each end and at the middle. The middle bolt is integral with or fastened into the tread block. This bolt, by means of its head or similar type device, serves to hold the block to the continuous band track. The shank of this bolt is used for holding and attaching the guides which keep the track centered on the driving sprockets, wheels, etc.

One difficulty with a construction of this sort has been the awkwardness of removing the nut from the central bolt when replacing the removable tread.

According to this invention the removable tread is not bolted at the center to the track, but the upper surface of the removable tread is designed so that the tread is driven by the head of the center bolt used for fastening the sprocket guides, but without the tread being bolted to the track by this center bolt. This bolt is in no way integral with the tread block but may fit into the tread block after assembly of the tread block to the track. In this way the driving force of the sprocket is transmitted to the center of each removable tread, and almost directly, but the tread block may be removed and replaced without removing the center bolt or guides.

The removable treads are each composed of a metal shoe to which the rubber tread is vulcanized. In order to have the tread in driving relation with the bolt an opening may be provided in the shoe into which the bolt head fits; or an area of the shoe may be depressed to receive the bolt head; or a rib may be provided on the shoe against which the bolt head will press. Any such means for imparting the driving force of the vehicle to the center of the removable tread may be used.

The improved tread of this invention is bolted to the continuous track only at its outer ends. This makes it easily removable, and the driving force from the driving sprocket is transmitted to the center or any other suitable part of the removable tread by some such means as described.

The invention will be further described in connection with the accompanying drawing in which Fig. 1 is a vertical section through a removable tread at the lateral center of the clamping plates; Fig. 2 is a section on the line 2—2 of Fig. 1; and Fig. 3 is a plan view of a central portion of the track. The drawing shows the cable 1 which is wound helically the length of the continuous track and is clamped between the upper clamping plate 2 and the lower clamping plate 3 at regular intervals. The rubber track 4 for the bogie wheels is vulcanized to the upper surface of the upper plate 2, and a cushion of rubber 5 is fastened or adhered to the lower surface of the lower plate. The under plate 3 is pedestaled at 6.

As shown in Fig. 2 the tread block is composed of the shoe 10 and the rubber tread 11. The tread is grooved across the center to give better traction, as shown in Fig. 2. The shoe is flanged at both sides and is also flanged around the hole at the center. The flanged hole provides a depression in the upper face of the shoe. This latter flange 12 forms a relatively tight-fitting pocket for the head 13 of the bolt 14 or other projection from the lower clamping plate which holds the sprocket guides 15 to the continuous track.

As shown in Fig. 1 the head 13 of the bolt 14 preferably passes all the way through the metal shoe 10 and is countersunk into the tread rubber 11. If preferred the shoe need not be punctured but may be shaped to fit the bolt head 13, or there may be a slight clearance between the bolt head and rubber. The shoe 10 is preferably ribbed longitudinally to strengthen it.

The sprocket guides 15 are of the usual design and overlap in the usual way. They are fastened firmly to the clamping plates 2 and 3 by the bolt 14. At each side of the upper clamping plate at the longitudinal center of the track is a lip 16 against which the driving sprocket presses in driving the track. 17 is the base portion of the sprocket guides to which the wings 15 are attached.

The removable tread block is held to the track by the bolts 20. The shoe 10 is flush against the pedestals 6 on the lower clamping plates 3 at each end of the track. The heads 21 of the bolts 20 are preferably covered over with rubber which is vulcanized to the shoe and to these heads. If preferred, the tread rubber may be cut away around the heads, or the treads may be short so that they do not extend beyond the heads. In the preferred form of the invention the bolts 20 are held in place while the tread 11 is vulcanized to the shoe, and the tread is simultaneously vulcanized over the head 21 of the bolt 20 and holds this bolt in place.

In use, the tread blocks wear down, and occasionally a large chunk of rubber is torn away from one of the blocks. It is therefore necessary to replace these blocks from time to time. The present track and removable tread blocks are so designed that any one or more tread blocks may be very easily removed from the continuous tracks.

When it becomes necessary to replace a tread block the nuts 22 at each end of the tread block are loosened, and the shoe 10 with the tread 11 is removed by slipping the bolts 20 out of the bolt holes at the ends of the clamping plates. A new tread block is then put in place and is secured merely by tightening the nuts 22.

The track is driven by a sprocket which straddles the bolt 14 and presses against the lip 16. The driving force of the sprocket is therefore transmitted almost directly from the sprocket to the center of the removable tread by the head 13 of the bolt 14.

What I claim is:

1. In combination with a continuous track for a track laying vehicle made of a helically wound cable the turns of which are held in spaced relation by clamping plates to which sprocket guides are bolted by means of a bolt with a head which protrudes beyond the clamping plates, a shoe with a tread vulcanized to one side thereof, means at each end of the shoe adapted to secure the shoe to the clamping plates and to fasten the clamping plates together, and in the center of the shoe a recess for receiving said bolt head in driving relation therewith.

2. In combination with a continuous track for a track laying vehicle made of a helically wound cable the turns of which are held in spaced relation by upper and lower clamping plates spaced at regular intervals along the length thereof with which the sprocket which drives the track contacts and to which sprocket guides are bolted by a bolt, the head of which protrudes below the lower clamping plate, a metal shoe with a rubber tread vulcanized to the lower surface thereof, means for holding each end of each shoe to the clamping plates and a hole in the center of the shoe through which the head of the central bolt passes in close-fitting relationship thereto.

3. In combination with a continuous track for a track laying vehicle made of helically wound cable the turns of which are held in spaced relation by upper and lower clamping plates, a shoe with a tread vulcanized to the lower face and a depression in the upper face into which a projection from the lower clamping plate fits so as to prevent movement of the shoe longitudinally with respect to the track.

4. A continuous track for a track laying vehicle and including endless load-carrying reinforcing means, transversely extending members secured to the reinforcing means at regularly spaced intervals, an endless rubber-like body vulcanized to the reinforcing means and to the transversely extending members, a tread shoe for each transverse member comprising a metal base plate and a rubber-like tread body, means releasably securing the ends of each tread shoe to the ends of its associated transverse member, a sprocket guide for each transverse member, means securing each sprocket guide to the side of its associated transverse member opposite the tread shoe, means associated with the last-named means and having only a driving engagement with the base plate of the tread shoe, and a surface on each transverse member adapted to have driving engagement with a drive sprocket.

5. A continuous track for a track laying vehicle and including endless load-carrying reinforcing means, transversely extending members secured to the reinforcing means at regularly spaced intervals, an endless rubber-like body vulcanized to the reinforcing means and to the transversely extending members, a tread shoe for each transverse member comprising a metal base plate and a rubber-like tread body, means releasably securing the ends of each tread shoe to the ends of its associated transverse member, and means other than the last-named means carried by each transverse member and having only a driving connection with the associated tread shoe.

KARL B. KILBORN.